US011112121B2

(12) United States Patent
Park et al.

(10) Patent No.: US 11,112,121 B2
(45) Date of Patent: Sep. 7, 2021

(54) COOKING ENGAGEMENT SYSTEM WITH AUTOMATIC COOKTOP MONITORING

(71) Applicant: Haier US Appliance Solutions, Inc., Wilmington, DE (US)

(72) Inventors: Seung-Yeong Park, Seongnamsi (KR); Jongdeok Jang, Seoul (KR); Hang Il Ahn, Seoul (KR); JayHuan Ryu, Seongnam-si (KR); Woong Jeon, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/592,864

(22) Filed: Oct. 4, 2019

(65) Prior Publication Data
US 2021/0102707 A1   Apr. 8, 2021

(51) Int. Cl.
| | |
|---|---|
| *F24C 7/08* | (2006.01) |
| *G06K 9/00* | (2006.01) |
| *H05B 6/06* | (2006.01) |
| *F24C 3/12* | (2006.01) |

(52) U.S. Cl.
CPC .............. *F24C 7/083* (2013.01); *F24C 3/126* (2013.01); *G06K 9/00624* (2013.01); *H05B 6/062* (2013.01)

(58) Field of Classification Search
CPC ..... F24C 7/083; F24C 3/126; G06K 9/00624; H05B 6/062
See application file for complete search history.

(56) References Cited

U.S. PATENT DOCUMENTS

| | | | |
|---|---|---|---|
| 2010/0182136 A1 | 7/2010 | Pryor | |
| 2011/0253693 A1* | 10/2011 | Lyons | F24C 15/2021 219/209 |
| 2012/0026381 A1* | 2/2012 | Lee | H04N 5/23219 348/333.12 |
| 2015/0300652 A1* | 10/2015 | Guan | G06K 9/627 348/187 |
| 2016/0084507 A1* | 3/2016 | Ortmann | F24C 7/083 219/447.1 |
| 2019/0200797 A1* | 7/2019 | Diao | G05B 19/42 |
| 2019/0261459 A1* | 8/2019 | Cha | H04L 12/2816 |
| 2020/0367692 A1* | 11/2020 | Stipe | G08B 5/36 |

FOREIGN PATENT DOCUMENTS

| | | |
|---|---|---|
| CN | 105526614 A | 4/2016 |
| CN | 207199040 U | 4/2018 |
| KR | 101791498 B1 | 10/2017 |

\* cited by examiner

*Primary Examiner* — Quan-Zhen Wang
*Assistant Examiner* — Mancil Littlejohn, Jr.
(74) *Attorney, Agent, or Firm* — Dority & Manning, P.A.

(57) ABSTRACT

A cooking engagement system and methods therefore are provided. The method includes obtaining image data of the cooktop surface and displaying a first user interface at an interactive assembly associated with the appliance. The first user interface displays the image data of the cooktop surface. The method further includes determining that cookware is present on the cooktop surface based on the image data, and displaying a second user interface at the interactive assembly. The second user interface displays an enlarged image of the cookware based on determining that the cookware is present on the cooktop surface.

18 Claims, 12 Drawing Sheets

COOKING ENGAGEMENT SYSTEM WITH AUTOMATIC COOKTOP MONITORING

FIELD OF THE INVENTION

The present subject matter relates generally to systems for aiding cooking operations, and more particularly to systems for enhancing cooking engagement and convenience with a cooktop appliance.

BACKGROUND OF THE INVENTION

Cooktop or range appliances generally include heating elements for heating cooking utensils, such as pots, pans, and griddles. A variety of configurations can be used for the heating elements located on the cooking surface of the cooktop. The number of heating elements or positions available for heating on the range appliance can include, for example, four, five, six, or more depending upon the intended application and preferences of the buyer. These heating elements can vary in size, location, and capability across the appliance.

Some systems may implement some form of intelligent cooking assistance. Unfortunately, existing intelligent cooking assistance systems can provide an unsatisfactory user experience and can inhibit a user's desired interactions. For example, some intelligent cooking assistance may rely only on temperature feedback and user input of cookware data (e.g., cast iron, stainless steel, etc.). Therefore, if a user misrepresents the cookware or if the temperature sensor is faulty, the intelligent cooking assistance provided may be more cumbersome than useful.

As a result, improved systems are needed for facilitating user engagement and interaction during use of a cooktop appliance. In particular, it may be advantageous to provide a user engagement system to permit monitoring of a cooktop appliance. In some cases, it may be advantageous to further provide a user engagement system configured to automatically detect faults or issues with cookware and/or contents of cookware being used on a cooktop appliance.

BRIEF DESCRIPTION OF THE INVENTION

Aspects and advantages of the invention will be set forth in part in the following description, or may be obvious from the description, or may be learned through practice of the invention.

In one example aspect of the present disclosure, a method of automatic monitoring of a cooktop surface of an appliance is provided. The method includes obtaining, by one or more processors, image data of the cooktop surface and providing for display, by the one or more processors, a first user interface at an interactive assembly associated with the appliance. The first user interface can display the image data of the cooktop surface. The method also includes determining, by the one or more processors, that cookware is present on the cooktop surface based on the image data, and providing for display, by the one or more processors, a second user interface at the interactive assembly. The second user interface can display an enlarged image of the cookware based on determining that the cookware is present on the cooktop surface.

In another example aspect of the present disclosure, a system of automatic monitoring of a cooktop surface of an appliance is provided. The system includes an interactive assembly. The interactive assembly includes a casing, an image monitor supported by the casing, an imaging sensor mounted to or within the casing, and a controller communicatively coupled with the imaging sensor. The controller is configured to obtain image data, from the imaging sensor, of the cooktop surface and display a first user interface at the image monitor of the interactive assembly. The first user interface displays the image data of the cooktop surface. The controller is further configured to determine that cookware is present on the cooktop surface based on the image data, and display a second user interface at the image monitor of the interactive assembly. The second user interface displays an enlarged image of the cookware based on determining that the cookware is present on the cooktop surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present disclosure. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 1:
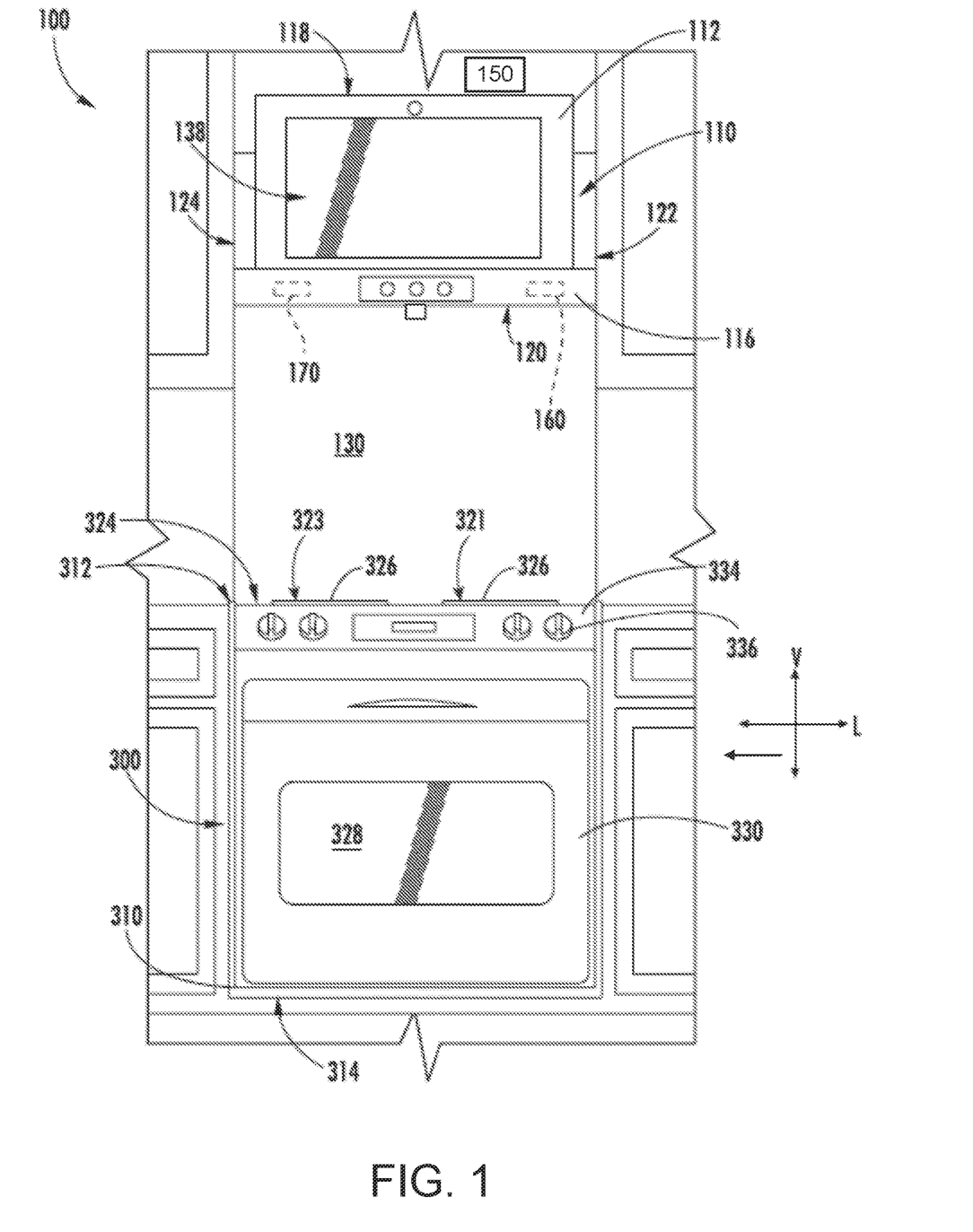
FIG. 1 provides a front perspective view of a system according to example embodiments of the present disclosure.
Figure 2:
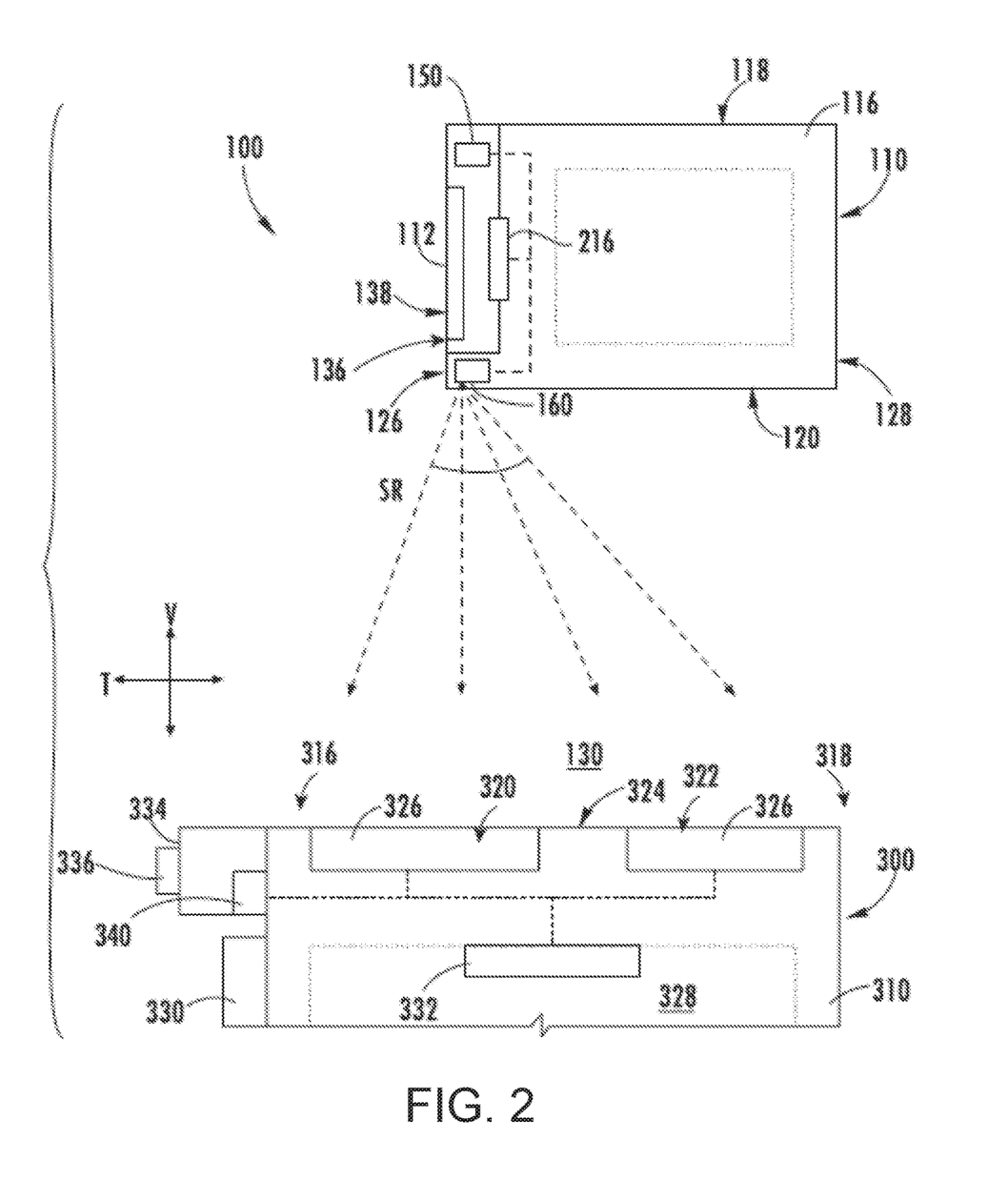
FIG. 2 provides a side schematic view of the example system of FIG. 1.
Figure 3:
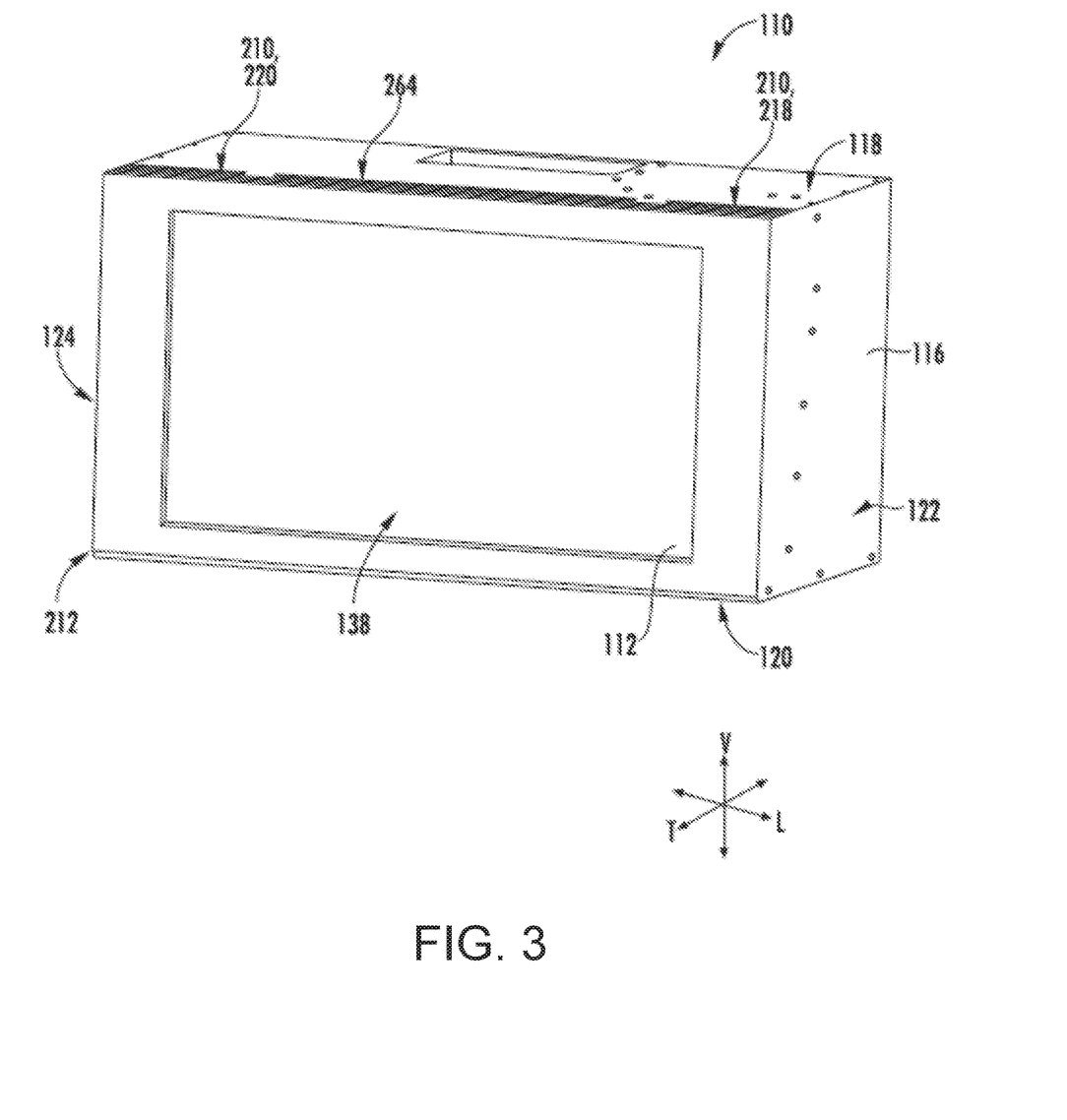
FIG. 3 provides a perspective view of an interactive assembly of a system according to example embodiments of the present disclosure.

FIGS. 1 and 2 provide various views of a system 100 according to example embodiments of the present disclosure. Generally, system 100 includes a cooktop appliance 300 and an interactive assembly 110 positioned above cooktop appliance 300 as shown in FIGS. 1 and 2. The features of cooktop appliance 300 and interactive assembly 110 are provided below.

As shown in FIGS. 1 and 2, cooktop appliance 300 defines a vertical direction V, a lateral direction L (FIG. 1), and a transverse direction T (FIG. 2). The vertical, lateral, and transverse directions V, L, T are mutually perpendicular and form an orthogonal direction system. For this embodiment, cooktop appliance 300 extends between a top portion 312 and a bottom portion 314 (FIG. 1), e.g., along the vertical direction V; between a left side portion and a right side portion, e.g., along the lateral direction L; and between a front portion 316 and a rear portion 318 (FIG. 2), e.g., along the traverse direction T.

Cooktop appliance 300 includes a chassis or cabinet 310 and a cooktop surface 324 having one or more heating elements 326 for use in, for example, heating or cooking operations. In some embodiments, cooktop surface 324 is constructed with ceramic glass. In other embodiments, however, cooktop surface 324 may be formed of another suitable material, such as a metallic material (e.g., steel) or another suitable non-metallic material. Heating elements 326 may be various sizes and may employ any suitable method for heating or cooking an object, such as a cooking utensil (not shown), and its contents. In some embodiments, for example, heating element 326 uses a heat transfer method, such as electric coils or gas burners, to heat the cooking utensil. In other embodiments, however, heating element 326 uses an induction heating method to heat the cooking utensil directly. Accordingly, heating element 326 may include a gas burner element, resistive heat element, radiant heat element, induction element, or another suitable heating element. As shown particularly in FIG. 2, for this embodiment, the cooktop appliance 300 includes at least one forward heating element 320 and at least one rear heating element 322.

In addition, as further shown in FIGS. 1 and 2, cabinet 310 is insulated and defines a cooking chamber 328 selectively covered by a door 330. One or more chamber heating elements 332 (e.g., top broiling elements or bottom baking elements) may be enclosed within cabinet 310 to heat cooking chamber 328. Chamber heating elements 332 within cooking chamber 328 may be provided as any suitable element for cooking the contents of cooking chamber 328, such as an electric resistive heating element, a gas burner, a microwave element, a halogen element, etc. Thus, cooktop appliance 300 may be referred to as an oven range appliance. As will be understood by those skilled in the art, cooktop appliance 300 is provided by way of example only, and the present subject matter may be used in the context of any suitable cooktop appliance, such as a standalone cooktop fitted integrally with a surface of a kitchen counter. Thus, the example embodiments illustrated in the figures are not intended to limit the present subject matter to any particular cooking chamber or heating element configuration, except as otherwise indicated.

As illustrated, cooktop appliance 300 includes a user interface panel 334, e.g., positioned at the forward portion 316 of the cooktop appliance 300. Although shown at front portion 316 of cooktop appliance 300, another suitable locations or structures (e.g., a backsplash) for supporting user interface panel 334 may be provided in alternative embodiments. For this embodiment, user interface panel 334 includes input components or controls 336, such as one or more of a variety of electrical, mechanical, or electro-mechanical input devices. Controls 336 may include, for example, rotary dials, knobs, push buttons, and touch pads. A controller 340 (FIG. 2) is communicatively coupled with user interface panel 334 and controls 336, e.g., by a suitable wired or wireless connection, for controlling cooktop appliance. Thus, a user may select various operational features and modes via controls 336 and monitor progress of cooktop appliance 300. In additional or alternative embodiments, user interface panel 334 includes a display component, such as a digital or analog display, communicatively coupled with controller 340. The display component is configured to provide operational feedback to a user. In certain embodiments, user interface panel 334 represents a general purpose I/O ("GPIO") device or functional block.

As noted above, controller 340 is communicatively coupled (i.e., in operative communication) with user interface panel 334 and controls 336. Controller 340 may also be communicatively coupled with various operational components of cooktop appliance 300 as well, such as heating elements (e.g., 326, 332), sensors, etc. Input/output ("I/O") signals may be routed between controller 340 and the various operational components of cooktop appliance 300. Thus, controller 340 can selectively activate and operate these various components. Various components of cooktop appliance 300 are communicatively coupled with controller 340 via one or more communication lines such as, for example, conductive signal lines, shared communication busses, or wireless communications bands.

In some embodiments, controller 340 includes one or more memory devices and one or more processors. The processors can be any combination of general or special purpose processors, CPUs, or the like that can execute programming instructions or control code associated with operation of cooktop appliance 300. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 340 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 340 includes a network interface such that controller 340 can connect to and communicate over one or more networks with one or more network nodes. Controller 340 can also include one or more transmitting, receiving, or transceiving components for transmitting/receiving communications with other devices communicatively coupled with cooktop appliance 300.

Additionally or alternatively, one or more transmitting, receiving, or transceiving components can be located off board controller 340. Generally, controller 340 can be positioned in any suitable location throughout cooktop appliance 300. For example, controller 340 may be located proximate user interface panel 334 toward front portion 316 of cooktop appliance 300.

As shown further in FIGS. 1 and 2, interactive assembly 110 includes one or more casings positioned above cooktop appliance 300 along the vertical direction V. For this embodiment, interactive assembly 110 includes a casing 116 positioned above cooktop appliance 300. Casing 116 includes a plurality of outer walls and generally extends between a top end 118 and a bottom end 120, e.g., along the vertical direction V; between a first side end 122 and a second side end 124 (FIG. 1), e.g., along the lateral direction L; and between a front end 126 and a rear end 128 (FIG. 2), e.g., along the transverse direction T. In some embodiments, casing 116 is spaced from cooktop surface 324 along the vertical direction V. An open region 130 may thus be defined along the vertical direction V between cooktop surface 324 and bottom end 120 of casing 116.

In some embodiments, casing 116 is formed as a range hood. However, a range hood is provided by way of example only. Other configurations may be used within the spirit and scope of the present disclosure. For example, casing 116 could be part of a microwave or other appliance designed to be located above cooktop surface 324. Moreover, although a generally rectangular shape is illustrated, any suitable shape or style may be adapted to form the structure of casing 116.

As further depicted in FIGS. 1 and 2, the interactive assembly 110 includes a controller 150 and an image monitor 112 communicatively coupled thereto. The image monitor 112 is mounted to and supported by casing 116. Image monitor 112 is provided above cooktop surface 324, e.g., along the vertical direction V. More particularly, for this embodiment, image monitor 112 is mounted to and supported on casing 116 (e.g., directly above cooktop surface 324) proximate to the front end 126 of casing 116. Generally, image monitor 112 may be any suitable type of mechanism for visually presenting an image (e.g., a digital image). For example, image monitor 112 may be a liquid crystal display (LCD), a plasma display panel (PDP), a cathode ray tube (CRT) display, etc. Image monitor 112 includes an imaging surface 138 (e.g., screen or display panel) at which the image is presented or displayed as an optically-viewable picture (e.g., static image or dynamic video) to a user. Optionally, a protective transparent panel (e.g., formed from a transparent glass, plastic, etc.) may be positioned across or over imaging surface 138. In such embodiments, the protective transparent panel is mounted within or supported on casing 116 forward of imaging surface 138 along the transverse direction T. In some example embodiments, the image monitor 112 has touchscreen capability. In this way, a user may touch various digitally presented images to control various features, such as e.g., the images displayed by image monitor 112, appliances communicatively coupled with controller 150, and other features, such as e.g., a camera, a microphone, etc.

The optically-viewable image at the imaging surface 138 of image monitor 112 may correspond to any suitable signal or data received or stored by interactive assembly 110 (e.g., at controller 150). As an example, image monitor 112 may present image data representative of the cooktop surface 324, such as still images or video. As another example, image monitor 112 may present a remotely captured image, such as a live (e.g., real-time) dynamic video stream received from a separate user or device. As yet another example, image monitor 112 may present a graphical user interface (GUI) that allows a user to select or manipulate various operational features of interactive assembly 110, cooktop appliance 300, or other components communicatively coupled with controller 150, e.g., via image monitor's touchscreen capabilities described above. During use of such GUI embodiments, a user may engage, select, or adjust the image presented at image monitor 112 through any suitable input, such as gesture controls detected through a camera assembly, voice controls detected through one or more microphones, associated touch panels (e.g., capacitance or resistance touch panel) or sensors overlaid across imaging surface 138, etc.

As illustrated in FIG. 2, the imaging surface 138 is oriented orthogonal to cooktop surface 324 and generally faces, or is directed away from, cooktop surface 324. In particular, imaging surface 138 is directed toward an area forward of cooktop appliance 300. During use, a user standing in front of cooktop appliance 300 may view the optically-viewable images (e.g., recipe, dynamic video stream, graphical user interface, etc.) displayed at imaging surface 138. Optionally, the imaging surface 138 may be positioned at an angle with respect to the vertical direction V.

As further shown in FIG. 2, interactive assembly 110 includes an imaging sensor 160. Generally, imaging sensor 160 is configured to capture image data of cooktop appliance 300. More particularly, imaging sensor 160 is configured to image data of the cooktop surface 324 and any cookware placed thereon. Image data is routed from imaging sensor 160 to controller 150. When operation is detected, image data provided by imaging sensor 160 are used by controller 150 to automatically display various GUI and/or image data to a user on the interactive assembly 110.

Imaging sensor 160 may be any suitable type of imaging sensor configured to obtain or capture image data including still images and/or video. For example, imaging sensor 160 may be a camera or other similar device. Imaging sensor 160 is mounted to or within casing 116. As shown in FIG. 2, imaging sensor 160 is mounted within casing 116. Imaging sensor 160 may be directly mounted to casing 116 or indirectly mounted to casing 116. As one example, imaging sensor 160 may be mounted to image monitor 112, which is in turn mounted to or supported by casing 116. As another example, imaging sensor 160 is mounted to a bracket that is in turn mounted to casing 116. Notably, imaging sensor 160 is mounted above the cooktop appliance 300, e.g., along the vertical direction V. In some example embodiments, the imaging sensor 160 is strategically mounted proximate a bottom end 136 of imaging surface 138 of image monitor 112, e.g., as shown in FIG. 2. In this way, the imaging sensor 160 has a generally unobstructed view of the cooktop surface 324.

In some embodiments, as shown in FIG. 2, imaging sensor 160 defines a sensing region SR. For this embodiment, sensing region SR is defined as generally the region in which image data may be obtained. It is noted that the imaging sensor may include zoom functionality which may change the sensing region SR dynamically. Zoom functionality may also be accomplished through use of the controller 150 to selectively enlarge different portions of the received image data.

In some embodiments, controller 150 is configured to receive, from imaging sensor 160, image data associated with the cooktop surface 324. Imaging sensor 160 may continuously obtain the image data such that the controller 150 may continuously monitor the image data. In some embodiments, imaging sensor 160 may obtain sequential still images. Such images may be processed at regular intervals to detect changes in cookware and/or occurrence of events such as boil-overs, excessive smoke, or fire. In some embodiments, the imaging sensor 160 may take or record video of the cooktop surface 324. Individual frames or segments of the video may then be processed as described herein.

Upon receiving the image data from imaging sensor 160, controller 150 is configured to process the image data to generate and render different user interfaces, to detect changes in cookware, and/or detect occurrence of events. Hereinafter, several example user interfaces generated through continuous monitoring, processing, and obtaining image data are described in detail.

Figure 4:
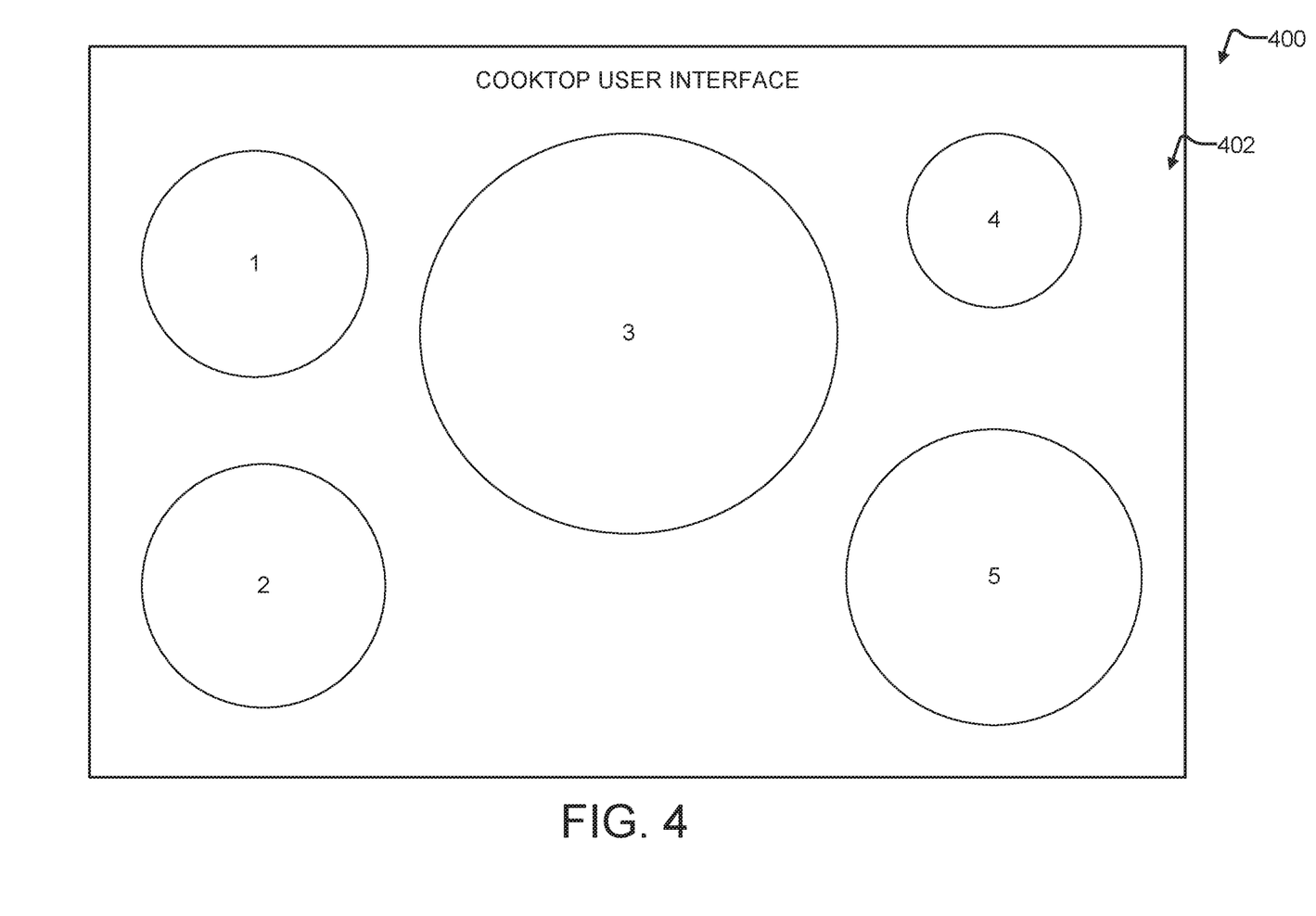
FIG. 4 provides a schematic of a user interface of an interactive assembly, according to example embodiments of the present disclosure.

FIG. 4 provides a schematic of a user interface 400 of an interactive assembly, according to example embodiments of the present disclosure. As shown, the user interface 400 includes a display of image data 402 of the cooktop surface 324. In this example, burners 1, 2, 3, 4, and 5 are clear and free of any cooking utensils or cookware. Once a piece of cookware is present, however, new useful user interfaces may be rendered.

Figure 5:
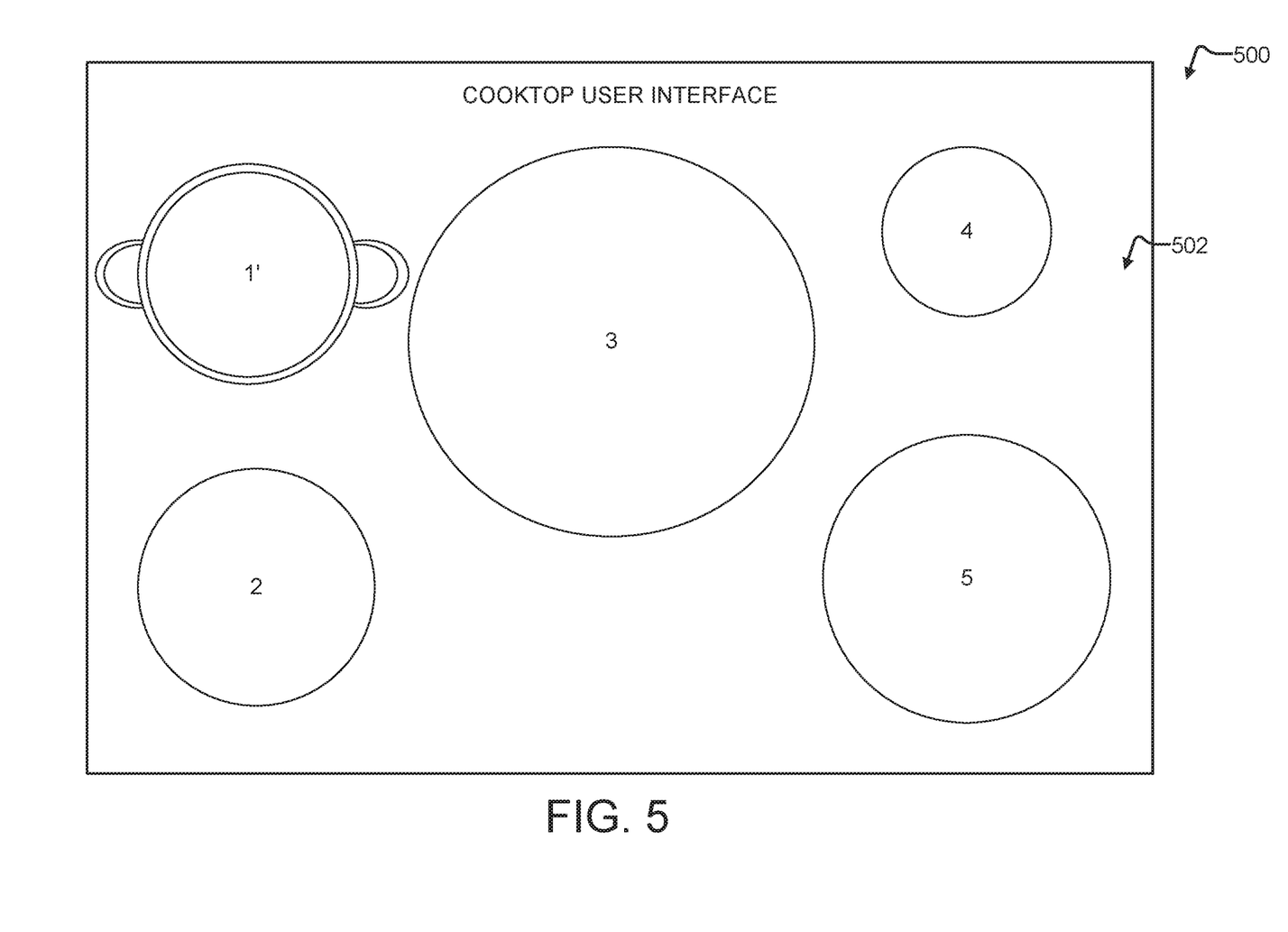
FIG. 5 provides a schematic of a user interface of an interactive assembly, according to example embodiments of the present disclosure.

FIG. 5 provides a schematic of a user interface 500 of an interactive assembly, according to example embodiments of the present disclosure. The user interface 500 shows image data 502 of the cooktop surface 324 having a piece of cookware 1' placed upon burner 1. Upon processing the image data 502 and determining that the cookware 1' is present, the controller 150 may generate a new user interface.

Figure 6:
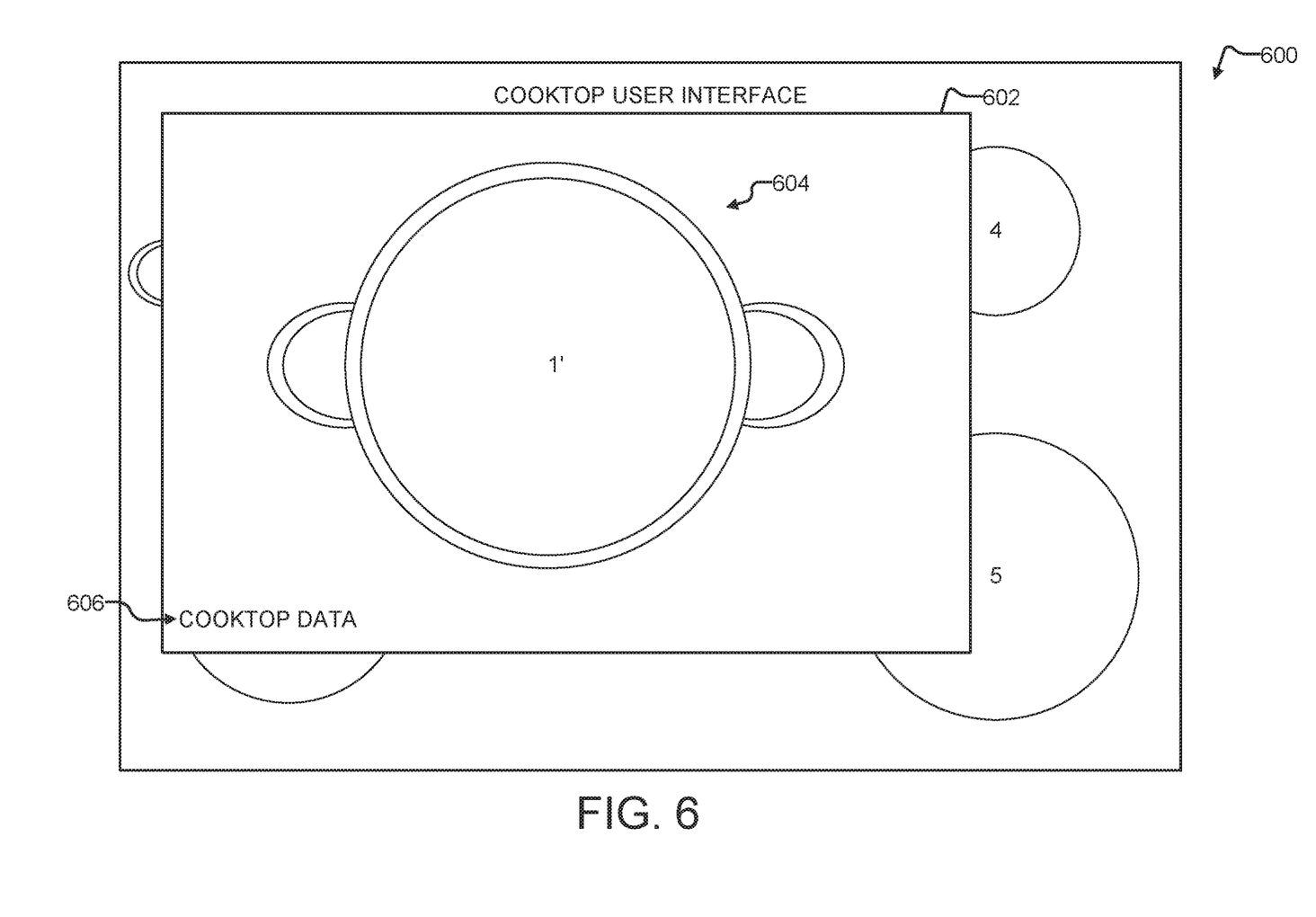
FIG. 6 provides a schematic of a user interface of an interactive assembly, according to example embodiments of the present disclosure.

FIG. 6 provides a schematic of a user interface 600 of an interactive assembly, according to example embodiments of the present disclosure. As shown, user interface 600 includes a new user interface element 602 having an enlarged image 604 of the cookware 1' displayed for a user. The enlarged image may be obtained through a zoom function of the imaging sensor 160 or image processing at the controller 150 to enlarge a portion of the image data 502. The user interface element 602 may also include a cooktop data display element 606 that includes text, image, or color reference of cooktop data for the burner 1. For example, the cooktop data may include temperature, time cooking, and other suitable data.

Figure 7:
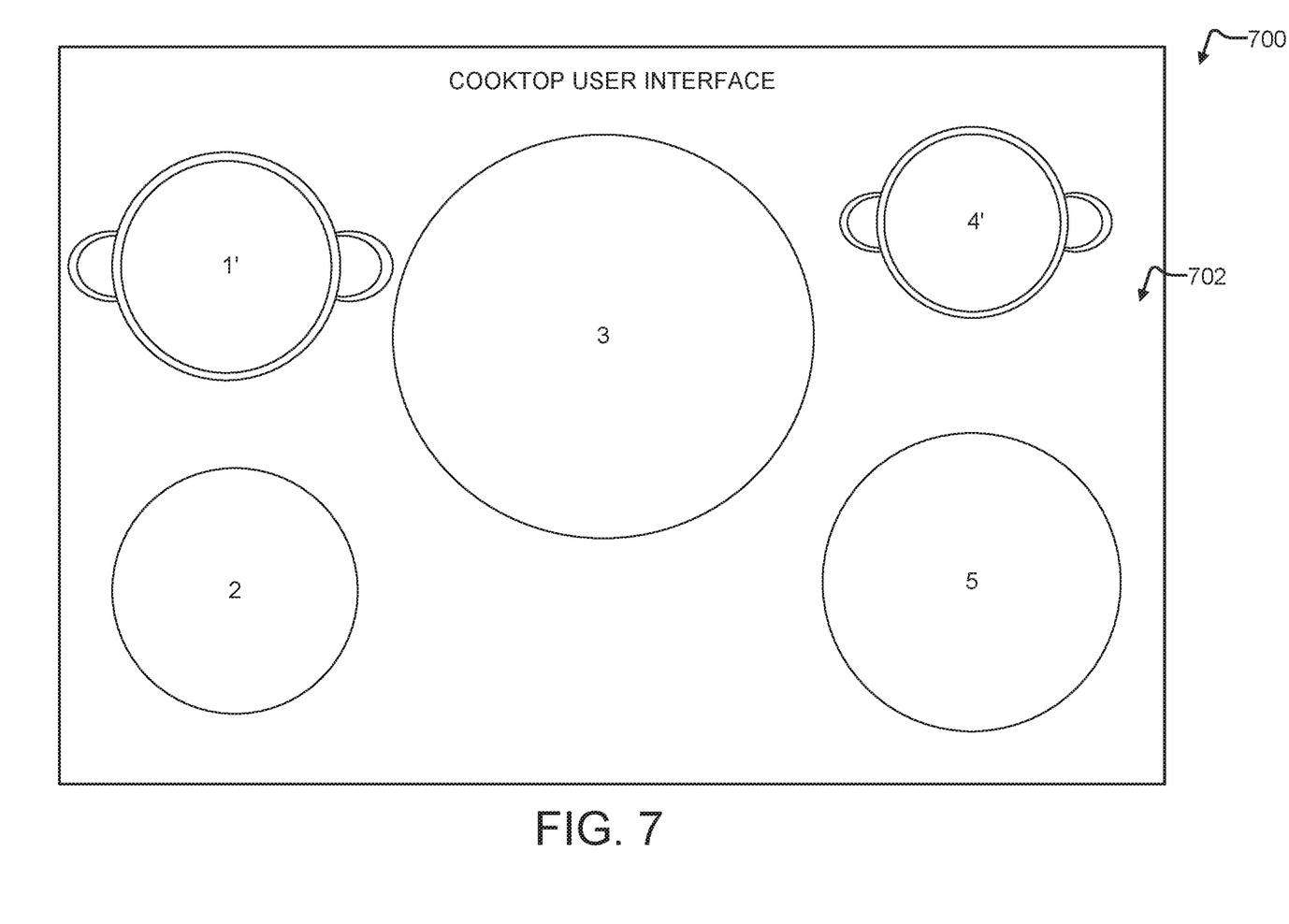
FIG. 7 provides a schematic of a user interface of an interactive assembly, according to example embodiments of the present disclosure.

If a user subsequently changes the arrangement of cookware on the cooktop surface 324, for example, by adding, moving, or removing cookware, the controller 150 may process the image data and create other user interfaces to display this new change. FIG. 7 provides a schematic of a user interface 700 of an interactive assembly, according to example embodiments of the present disclosure. As shown, the user interface 700 displays image data 702 of the cooktop surface 324. In this image data 702, a new piece of cookware 4' has been placed on burner 4. According, a new user interface 800 may be generated as described below.

Figure 8:
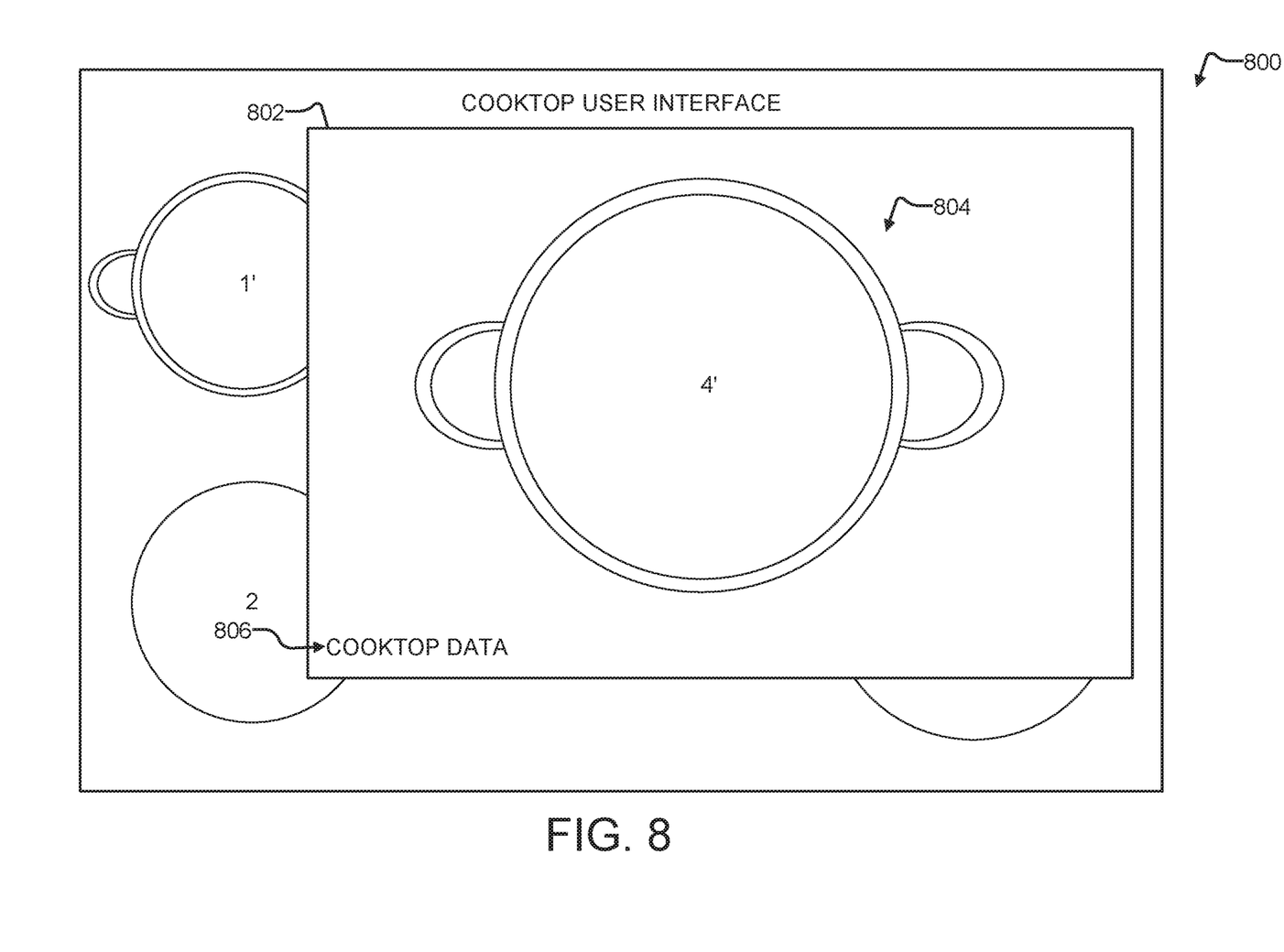
FIG. 8 provides a schematic of a user interface of an interactive assembly, according to example embodiments of the present disclosure.

FIG. 8 provides a schematic of the user interface 800 of an interactive assembly, according to example embodiments of the present disclosure. The user interface 800 includes user interface element 802 having an enlarged image 804 of the cookware 4' placed on the burner 4. The user interface element 802 may also display cooktop data 806, similar to cooktop data 606 described above.

It is noted that both user interface elements 602 and 802 may be rendered for display together, each with enlarged images, on a single user interface 600 or 800. Furthermore, the user interfaces may be touch-sensitive and arranged to receive user touch inputs. In this regard, a user may scroll through or select individual burners from which to display enlarged images. Other touch inputs and interactions are also available. For example, a user may selectively increase an image by sliding two fingers to get an even more in-depth view of cookware. All other touch inputs are considered to be within the scope of this disclosure.

Figure 9:
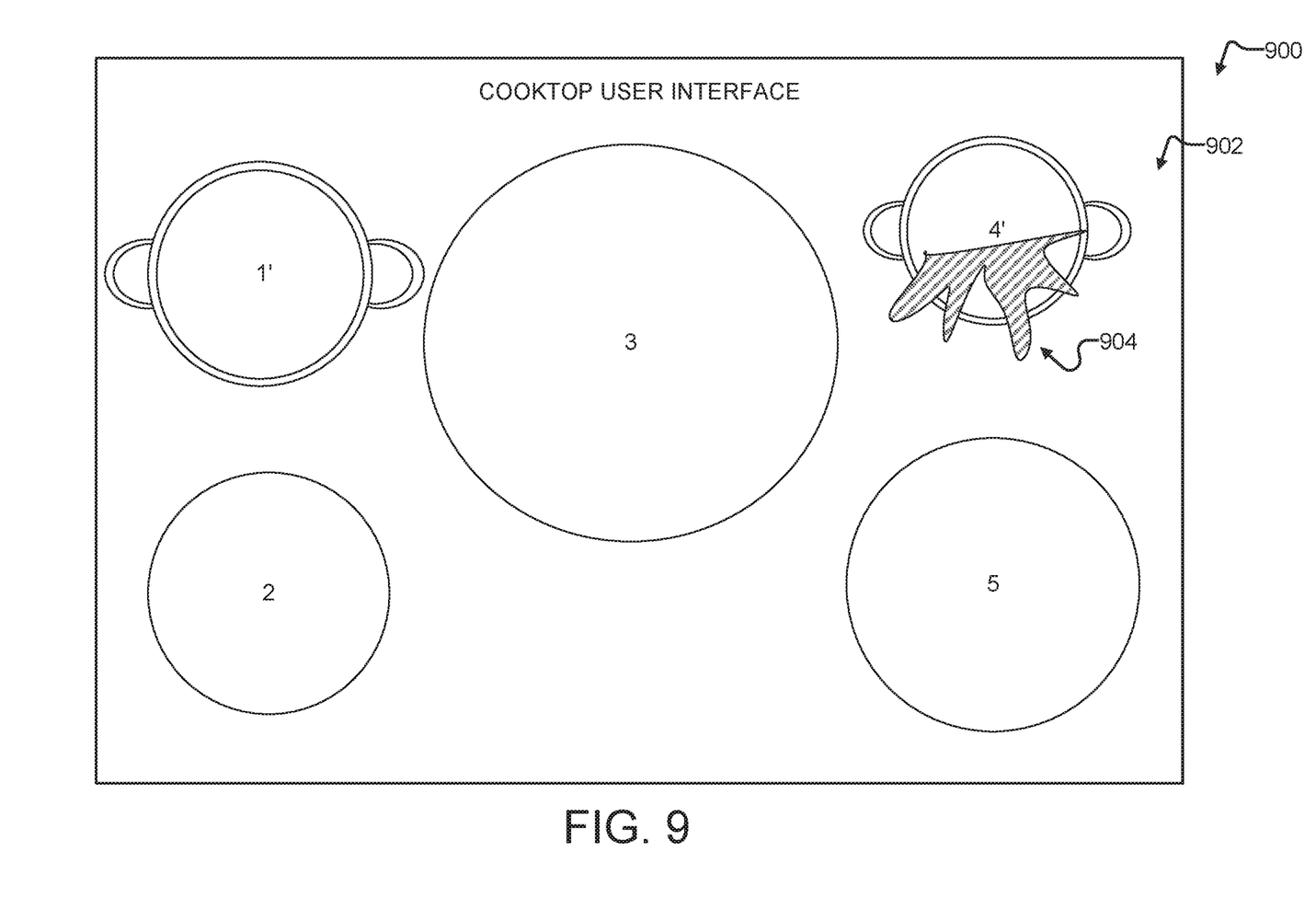
FIG. 9 provides a schematic of a user interface of an interactive assembly, according to example embodiments of the present disclosure.

FIG. 9 provides a schematic of a user interface 900 of an interactive assembly, according to example embodiments of the present disclosure. As shown in FIG. 9, the user interface 900 includes a display of image data 902 of the cooktop surface 324. In this example, an event 904 has occurred. The event 904 may include a boil-over, excessive smoke, a fire, a spill, or any other event identifiable through image capture and processing. Responsive to determining that the event 904 has occurred, the controller 150 may selectively initiate control or corrective action of the burner 4 (or any associated burner or portion of the cooktop) including raising temperature, lowering temperature, or turning off a portion of the cooktop surface 324 or particular burners of the cooktop surface 324. The controller 150 may also generate a new user interface 1000 associated with the detected event.

Figure 10:
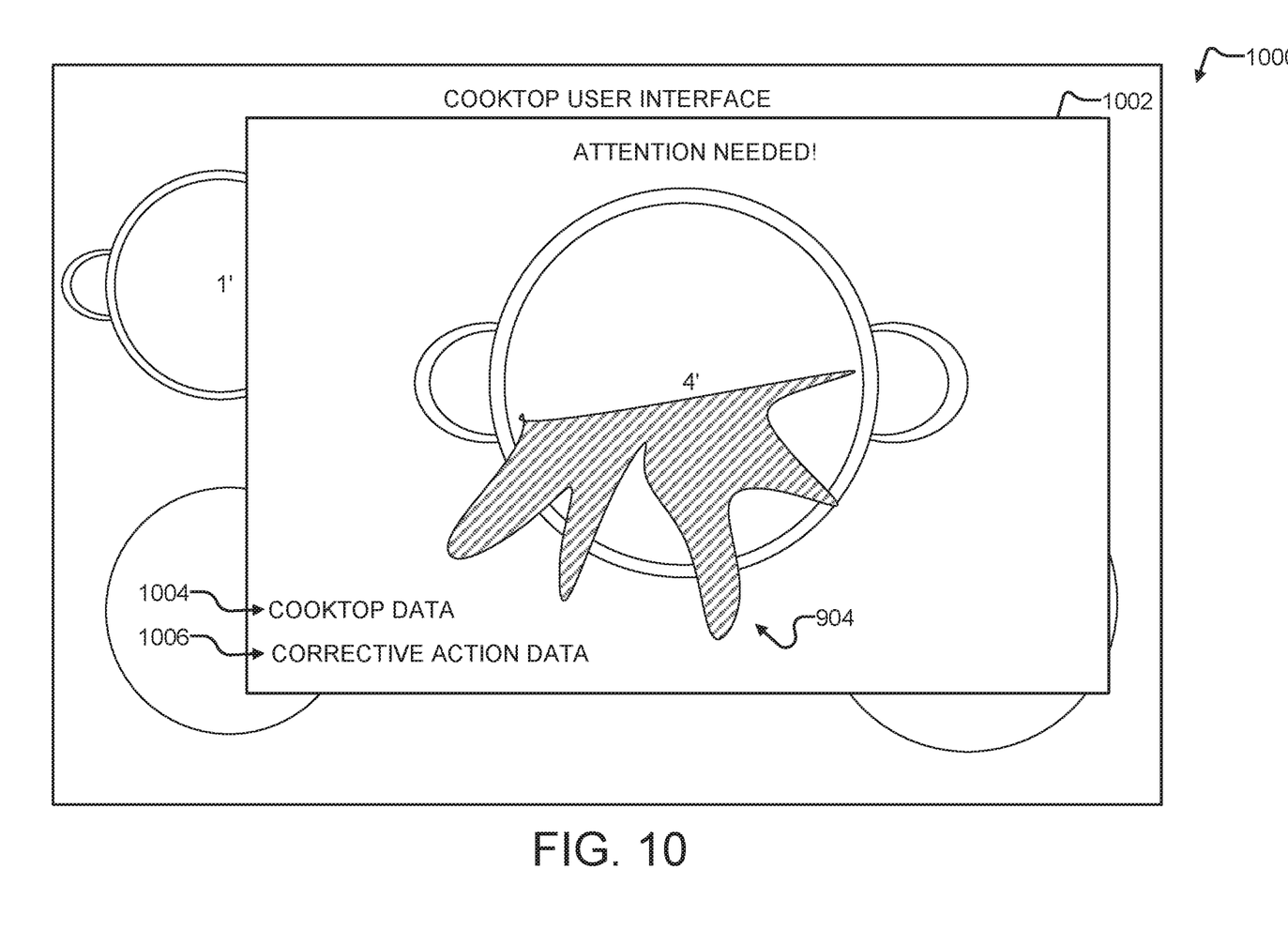
FIG. 10 provides a schematic of a user interface of an interactive assembly, according to example embodiments of the present disclosure.

FIG. 10 provides a schematic of the user interface 1000 of an interactive assembly, according to example embodiments of the present disclosure. The user interface 1000 includes a user interface element 1002 including a display of enlarged image data of the cookware 4' and the event 904. The user interface element 1002 may also include a display of current cooktop data 1004 and any corrective action data 1006.

The current cooktop data may include a current temperature or setting of the associated burner (e.g., burner 4). The corrective action data 1006 may include a display of images, text, or colors associated with attempting to satiate the event 904. For example, the corrective action data 1006 may include data showing the lowering of temperature quickly to reduce a boil-over or spill. The corrective action data 1006 may also include data showing the raising of temperature to avoid other issues, or the turning off of a burner or portion of the cooktop surface 324 to reduce a risk of fire or other hazard. Audible beeps or alarms may also be generated to alert a user that action is needed to minimize or reduce a hazard associated with event 904.

As described above, several user interfaces may be rendered and displayed to a user of the interactive assembly 110 and cooktop surface 324. Hereinafter, methods of automatic monitoring of a cooktop surface of an appliance are described in detail with reference to FIG. 11 and FIG. 12.

Figure 11:
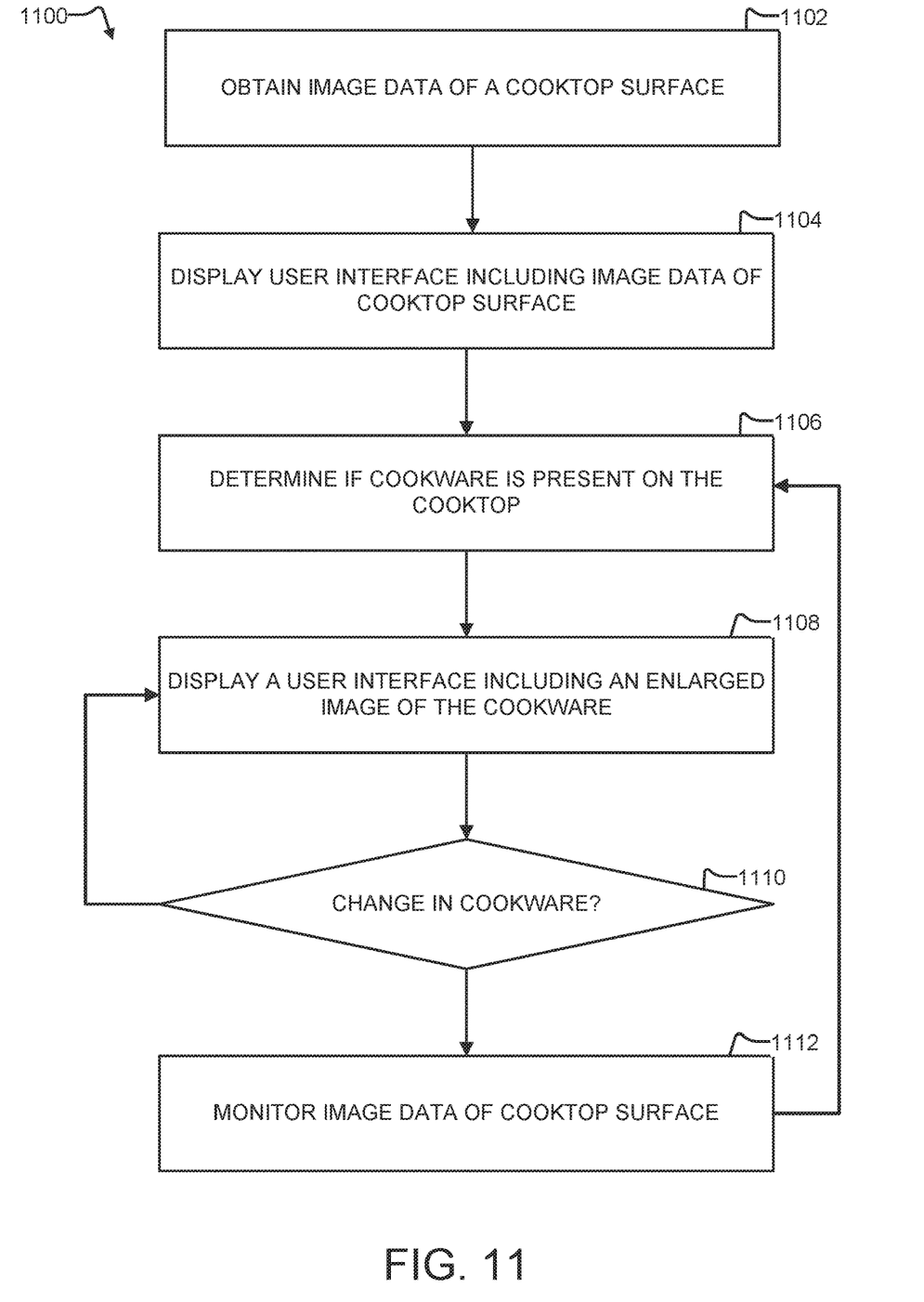
FIG. 11 provides a flow diagram of a method of automatic monitoring of a cooktop, according to example embodiments of the present disclosure.

FIG. 11 provides a flow diagram of a method 1100 of automatic monitoring of a cooktop, according to example embodiments of the present disclosure. As shown, the method includes obtaining image data of the cooktop surface, at block 1102. The image data may be obtained by the controller 150 from the imaging sensor 160. The image data obtained may include still image data or video data of the cooktop surface 324. The still image data may include sequential still images taken at regular or irregular intervals.

The method 1100 further includes displaying a user interface at an interactive assembly associated with the appliance, at block 1104. The user interface may be a first user interface, such as user interface 400. The first user interface may display the image data of the cooktop surface. The block 1104 may include generating the first user interface having at least a still image of the entire cooktop surface 324 and rendering the first user interface on the image monitor 112 of the interactive assembly 110.

The method 1100 further includes determining that cookware is present on the cooktop surface based on the image data, at block 1106. The determination that cookware is present may be facilitated through basic image processing of the obtained image data at the controller 150 or another suitable controller. The image processing may include processing the image data to determine a change from a baseline image (e.g., image data 402) and another current image showing a piece of cookware or a cooking utensil (e.g., image data 502).

The method 1100 further includes displaying a user interface at the interactive assembly including an enlarged image of the cookware, at block 1108. The user interface may be a second user interface. The second user interface displays the enlarged image of the cookware based on determining that the cookware is present on the cooktop surface. Generally, the first and second user interfaces are touch-sensitive user interfaces arranged to receive a user touch input. However, other user interfaces having selective touch input or no input at all may be implemented under some circumstances.

The method 1100 further includes determining that cookware on the cooktop surface has changed, at block 1110. Responsive to the change in cookware, an additional user interface may be displayed at the interactive assembly. The additional user interface may be a third user interface. The third user interface may display an enlarged image of a change in cookware based on determining that the cookware on the cooktop surface has changed.

Generally, determining that the cookware on the cooktop surface has changed can include determining that cookware has been added, removed, or changed on the cooktop surface. This determination may be facilitated through image processing at the controller 150.

The method 1100 further includes continuously obtaining and monitoring image data of the cooktop surface, at block 1112. The continuous monitoring may be facilitated through implementation of video recording or sequential still images obtained through the imaging sensor 160.

Figure 12:
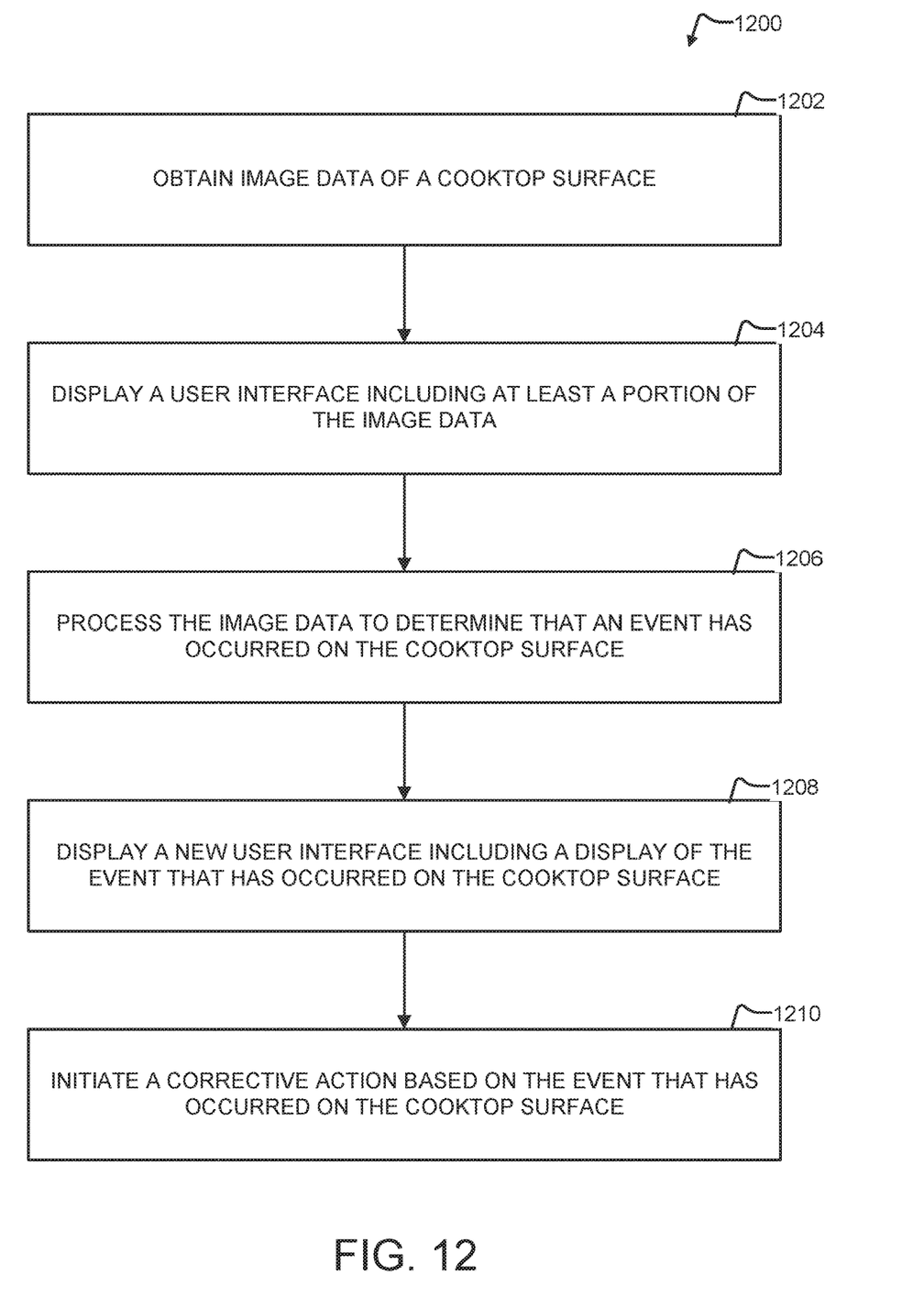
FIG. 12 provides a flow diagram of a method of automatic monitoring of a cooktop, according to example embodiments of the present disclosure.

FIG. 12 provides a flow diagram of a method 1200 of automatic monitoring of a cooktop, according to example embodiments of the present disclosure. The method 1200 includes obtaining image data of a cooktop surface of an appliance, at block 1202.

The method 1200 further includes displaying a user interface including at least a portion of the image data, at block 1204. For example, user interface 900 includes a display of image data associated with the cooktop surface 324 and cookware 4' on burner 4.

The method 1200 further includes processing the image data to determine that an event has occurred on the cooktop surface, at block 1206. For example, event 904 may have occurred. Determination that event 904 has occurred may include image processing at the controller 150 based on machine learning of training image data displaying a wide variety of possible events. Upon training the machine learning algorithm, the same algorithm may be implemented at the controller 150 to identify events in substantially real-time.

The method 1200 also includes displaying a new user interface including a display of the event that has occurred on the cooktop surface, at block 1208. For example, user interface 1000 includes a user interface element 1002 displayed which further includes an enlarged image of the event 904.

The method 1200 also includes initiating a corrective action based on the event that has occurred on the cooktop surface, at block 1210. Generally, initiating a corrective action can include one or more of lowering a temperature of a portion of the cooktop surface, raising a temperature of a portion of the cooktop surface, and turning off a portion of the cooktop surface. The corrective action may be supplemented through user inputs at the interactive assembly 110 and/or the cooktop controls 336. Other corrective actions may also be suitable.

Aspects of the present disclosure provide a number of technical effects and benefits. For instance, aspects of the present disclosure provide for more efficient user interaction by improving the display of information related to active burners of the cooktop. The systems and methods can be used to emphasize useful information in real time. By efficiently zooming in on burners according to aspects of the present disclosure, active burners can be monitored from a distance. In addition, by automatically facilitating user interaction as described herein, computing resources can be preserved for other core functionality.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of automatic monitoring of a cooktop surface of a cooktop appliance, the method comprising:
   obtaining, by one or more processors, image data of the cooktop surface;
   providing, by the one or more processors, a first user interface for display on an image monitor of an interactive assembly associated with the cooktop appliance, the first user interface displaying the image data of the cooktop surface;
   determining, by the one or more processors, that a cookware item is present on the cooktop surface based on the image data;
   responsive to determining the cookware item is present on the cooktop surface, providing, by the one or more processors, a second user interface for display on the image monitor of the interactive assembly, the second user interface displaying an enlarged image of the cookware item;
   determining, by the one or more processors, occurrence of an event associated with the cookware item based, at least in part, on the image data;
   responsive to determining occurrence of the event, initiating, by the one or more processors, a corrective action associated with resolving the event; and providing, by the one or more processors, a third user interface for display on the image monitor of the interactive assembly, the third user interface displaying the event, the third user interface further displaying a visual notification indicative of the corrective action.

2. The method of claim 1, further comprising continuously obtaining and monitoring image data of the cooktop surface.

3. The method of claim 1, wherein obtaining image data comprises obtaining a still image or a video of the cooktop surface.

4. The method of claim 1, wherein providing for display, by the one or more processors, the first user interface comprises:
   generating the first user interface comprising at least a still image of an entirety of the cooktop surface; and
   rendering the first user interface on an image monitor of the interactive assembly.

5. The method of claim 1, wherein the first and second user interfaces are touch-sensitive user interfaces arranged to receive a user touch input.

6. The method of claim 1, wherein initiating a corrective action comprises at least one of lowering a temperature of a portion of the cooktop surface, raising a temperature of a portion of the cooktop surface, and turning off a portion of the cooktop surface.

7. The method of claim 1, wherein the event comprises a fire.

8. The method of claim 7, wherein the corrective action comprises powering down a heating element on which the cookware item is positioned.

9. The method of claim 8, wherein the visual notification indicates the heating element has been turned off.

10. The method of claim 1, wherein the event comprises a boil-over.

11. The method of claim 10, wherein the corrective action comprises reducing a power level of a heating element on which the cookware item is positioned from a first power level to a second power level, the second power level being lower than the first power level.

12. The method of claim 11, wherein the visual notification indicates cooling of the cookware item due, at least in part, to the power level of the heating element being reduced from the first power level to the second power level.

13. A system for automatic monitoring of a cooktop surface of a cooktop appliance, the system comprising:
   an interactive assembly, comprising:
      a casing;
      an image monitor supported by the casing;
      an imaging sensor mounted to or within the casing; and
      a controller communicatively coupled with the imaging sensor, the controller configured to:
         obtain image data, from the imaging sensor, of the cooktop surface;
         display a first user interface at the image monitor of the interactive assembly, the first user interface displaying the image data of the cooktop surface;
         determine that a cookware item is present on the cooktop surface based on the image data;
         display a second user interface at the image monitor of the interactive assembly, the second user interface displaying an enlarged image of the cookware based on determining that the cookware is present on the cooktop surface;
         determine occurrence of an event associated with the cookware item based, at least in part, on the image data;
         initiate a corrective action associated with resolving the event in response to determining occurrence of the event; and
         display a third user interface at the image monitor of the interactive assembly, the third user interface displaying the event, the third user interface further displaying a visual notification indicative of the corrective action.

14. The system of claim 13, further comprising continuously obtaining and monitoring image data of the cooktop surface.

15. The system of claim 13, wherein obtaining image data comprises obtaining a still image or video of the cooktop surface from the imaging sensor.

16. The system of claim 13, wherein displaying the first user interface comprises:
   generating the first user interface comprising at least a still image of an entirety of the cooktop surface; and
   rendering the first user interface on an image monitor of the interactive assembly.

17. The system of claim 13, wherein the first and second user interfaces are touch-sensitive user interfaces arranged to receive a user touch input.

18. The system of claim 13, wherein initiating a corrective action comprises at least one of lowering a temperature of a portion of the cooktop surface, raising a temperature of a portion of the cooktop surface, and turning off a portion of the cooktop surface.

* * * * *